(12) United States Patent
Zhu et al.

(10) Patent No.: US 12,392,149 B2
(45) Date of Patent: Aug. 19, 2025

(54) METHOD FOR REPAIRING WALL DISEASES OF EARTHEN ARCHITECTURE

(71) Applicant: Xi'an University of Technology, Xi'an (CN)

(72) Inventors: Caihui Zhu, Xi'an (CN); Song Qiu, Xi'an (CN); Zhuqing Li, Xi'an (CN); Sen Peng, Xi'an (CN); Junlian Li, Xi'an (CN); Yifan Chen, Xi'an (CN); Miaomiao Ge, Xi'an (CN); Jian Xu, Xi'an (CN); Zhenghong Liu, Xi'an (CN); Xiaosong Zhou, Xi'an (CN); Yunfeng Ma, Xi'an (CN); Yubo Li, Xi'an (CN); Changsong Dong, Xi'an (CN); Ning Li, Xi'an (CN)

(73) Assignee: Xi'an University of Technology, Xi'an (CN)

( * ) Notice: Subject to any disclaimer, the term of this patent is extended or adjusted under 35 U.S.C. 154(b) by 200 days.

(21) Appl. No.: 18/130,921

(22) Filed: Apr. 5, 2023

(65) Prior Publication Data

US 2023/0417074 A1    Dec. 28, 2023

(30) Foreign Application Priority Data

Jun. 22, 2022   (CN) .......................... 202210714452.0

(51) Int. Cl.
   *E04G 23/02*   (2006.01)
   *C04B 28/18*   (2006.01)

(52) U.S. Cl.
   CPC .......... *E04G 23/0211* (2013.01); *C04B 28/18* (2013.01); *E04G 23/0296* (2013.01)

(58) Field of Classification Search
   CPC ........ Y02W 30/91; C04B 18/08; C04B 28/02; C04B 14/361; E02D 3/12
   See application file for complete search history.

(56) References Cited

U.S. PATENT DOCUMENTS

| | | | |
|---|---|---|---|
| 4,084,381 A * | 4/1978 | Cain ......................... | E02D 3/12 |
| | | | 106/710 |
| 7,462,001 B2 * | 12/2008 | Canteri ............... | E04G 23/0203 |
| | | | 405/266 |
| 9,447,555 B2 * | 9/2016 | Abdullah .................. | E02D 3/00 |
| 9,738,830 B2 * | 8/2017 | Tao ....................... | C04B 28/006 |
| 10,344,440 B2 * | 7/2019 | Surjaatmadja .......... | E02D 31/08 |
| 11,118,315 B2 * | 9/2021 | Szynakiewicz ......... | E01B 1/001 |

* cited by examiner

*Primary Examiner* — Brian E Glessner
*Assistant Examiner* — Daniel J Kenny (57) ABSTRACT

A method for repairing wall diseases of an earthen architecture includes the following specific steps: S1: selecting raw material components, and mixing the raw material components to prepare a mixed material; S2: mixing the mixed material with plain soil at a certain ratio to form a repair material; and S3: mixing the repair material with water at a certain ratio to prepare slurry, adjusting the ratio of the repair material to water to prepare the slurry based on diseases of the earthen site, putting the slurry into a pressure grouting machine, and repairing the diseases of the earthen site by using the pressure grouting machine. The repair material prepared in the method features excellent performance, stable volume and good compatibility with a site. The method based on the repair material has certain practical significance in repairing diseases of the earthen site.

5 Claims, 11 Drawing Sheets

METHOD FOR REPAIRING WALL DISEASES OF EARTHEN ARCHITECTURE

CROSS REFERENCE TO THE RELATED APPLICATIONS

This application is based upon and claims priority to Chinese Patent Application No. 202210714452.0, filed on Jun. 22, 2022, the entire contents of which are incorporated herein by reference.

TECHNICAL FIELD

The present invention belongs to the technical field of repair of wall diseases of earthen architectures and protection of ancient sites, and particularly relates to a method for repairing wall diseases of an earthen architecture.

BACKGROUND

Protection of cultural heritages of river earthen sites and earthen dwellings (architectures) and heritage of native culture is relatively important project. An earthen material is regarded as "green concrete" with congenital advantages: thermal stability and moisture absorption and desorption actions adapted to climate, where the earthen material can improve the air quality, and is warm in winter and cool in summer; economy and convenience, where the earthen material can be obtained locally; operability, where the earthen architecture features simple construction technique and convenience in maintenance; recyclability and environmental-friendliness, where the earthen material is easily removed and can be recycled; better indoor application environment and good sound insulation and windproof permeability; certain durability; and green ecology. Therefore, the earthen architecture, a kind of the ancient architecture type, remains vital so far.

However, the earthen architecture has some defects such as poor mechanical property and water resistance, which makes the earthen material of the earthen architecture susceptible to moisture and damage. Therefore, it is quite urgent and necessary to conduct research on protection and repair of the earthen architectures (earthen sites) as early as possible. With respect to protection of the earthen sites, types of diseases of the sites and reinforcement methods for the sites are proposed. The reinforcement methods mainly include physical, chemical and biological reinforcement methods. The physical reinforcement methods mainly include anchoring techniques, bricklaying and repairing techniques and the like. In research processes, reinforcing bars, wood, *Phyllostachys pubescens* and geotechnical filaments become major anchor rod materials used for reinforcing the earthen sites. Chemical reinforcement mainly refers to adding a modifying material into plain soil, which is the frequently used reinforcement method. For example, materials such as hydraulic lime, sticky rice mortar tung oil, sintered loess doll and lime-metakaolin (L-MK) are added, and substances in a soil mass are chemically reacted with the modifying material to improve the performance of site soil. The biological reinforcement methods are mainly based on the biological carbonization principle, and reinforcement materials mainly include organic, inorganic and organic and inorganic mixed materials. Inorganic materials mainly have the advantage of good ageing-resistant performance and are closer to site bodies such as brick earth in physical and chemical properties, so the inorganic materials are better in compatibility. However, in practice, problems such as poor water resistance and permeability easily occur. The organic materials have good water resistance and permeability but poor durability and compatibility with the soil mass, and feature high cost, which is adverse to scaled production. At present, various materials such as a PS solution are applied to reinforcing the earthen sites. In the actual application, the solidified materials have large brittleness and shrinkage deformation, causing a phenomenon that the repaired part and the earthen site are separated. Thus, the repaired part falls off integrally. Sticky rice mortar paste, tung oil and the like for repair are poor in durability and are adverse to scaled production. Therefore, selection of a proper cementitious material is the key of repairing the sites.

SUMMARY

The objective of the present invention is to provide a method for repairing wall diseases of an earthen architecture, which solves the problem of poor repair effect due to poor compatibility between a repair material and a soil mass in the prior art.

The technical solution used in the present invention is as follows:

a method for repairing wall diseases of an earthen architecture is specifically performed according to the following steps:

S1: selecting raw material components: 1-4 parts of metakaolin, 1-4 parts of calcium hydroxide and 1-4 parts of a micro silicon powder, and mixing the raw material components to prepare a mixed material;

S2: mixing the mixed material with plain soil at a ratio of 1:5 to prepare a repair material;

S3: mixing the repair material with water at a ratio of 1:4-2:3 to prepare slurry, adjusting the ratio of the repair material to water to prepare the slurry based on diseases of the earthen site, putting the slurry into a pressure grouting machine, and repairing the diseases of the earthen site by using the pressure grouting machine; and S4: based on a contrast experiment, determining the extents of influence of the site by the external environment before and after repair, evaluating a repair result, and determining the repair result.

The present invention is further characterized in that in S1: the proportion of the components of the repair material is as follows: 1-3 parts of metakaolin, 2-4 parts of calcium hydroxide and 2-4 parts of a micro silicon powder.

In S1: the proportion of the mixed material is as follows: 1 part of metakaolin, 2 parts of calcium hydroxide and 4 parts of a micro silicon powder.

The pressure grouting machine includes a hopper and a case connected in sequence. The hopper is connected to a hose, a replaceable nozzle head is in threaded connection to the end of the hose away from the hopper, and the nozzle head includes a triangular nozzle, a round nozzle, a needle tube nozzle and a strip pattern nozzle.

S3 is specifically as follows:

diseases of the earthen site include large-area collapses, cracks and surface denudation.

For the large-area collapses: prefabricating plain bricks: cleaning the surface of the part to be repaired to obtain the plain bricks, injecting slurry into the pressure grouting machine, and bonding and laying cob bricks to the collapsed parts of the sites by using the pressure grouting machine with the triangular nozzle;

for the cracks: stirring the prepared slurry, removing miscellaneous soil on the surfaces of the cracks, scraping the cracks to V-shaped grooves, and watering the cracks for moisturizing; and using the needle tube nozzle or the strip pattern nozzle according to the shapes and sizes of the cracks, and injecting the slurry into the cracks of the V-shaped grooves through the pressure grouting machine for repair; and for the surface denudation: stirring the prepared slurry, cleaning regosol of denudated surfaces with pressurized wind, and watering the denudated surfaces for moisturizing; and spraying the slurry to the denudated surfaces through the pressure grouting machine by using the round nozzle.

The present invention has the beneficial effect that according to a method for repairing wall diseases of an earthen architecture provided by the present invention, different repair processes are proposed for different types of diseases. For the diseases of the large-area collapses and defects, a bonding and laying repair method is used; a grouting repair method is used for the cracks; and a spray method is used for repairing surface falling and surface denudation. With respect to changes of temperature, humidity, denudation rate and crack percent of an earthen wall before and after repair, the repair effect by an ACS material is comprehensively evaluated. The repair material has better compatibility with the earthen site and is close to the soil mass of the site in property. The original properties of the site will substantially not be changed after repair. The method has certain practical significance.

In the figures, 1, replaceable nozzle; 2, hopper; 3, case; 4, handle; 5, site body; 6, slurry; 7, thread; 8, spray hole; 9, triangular nozzle; 10, round nozzle; 11, needle tube nozzle; 12, strip pattern nozzle; 13, plain brick; and 14, TDR probe.

DETAILED DESCRIPTION OF THE EMBODIMENTS

The method for repairing wall diseases of an earthen architecture provided by the present invention is described in detail below in combination with drawings and specific embodiments.

Figure 1:
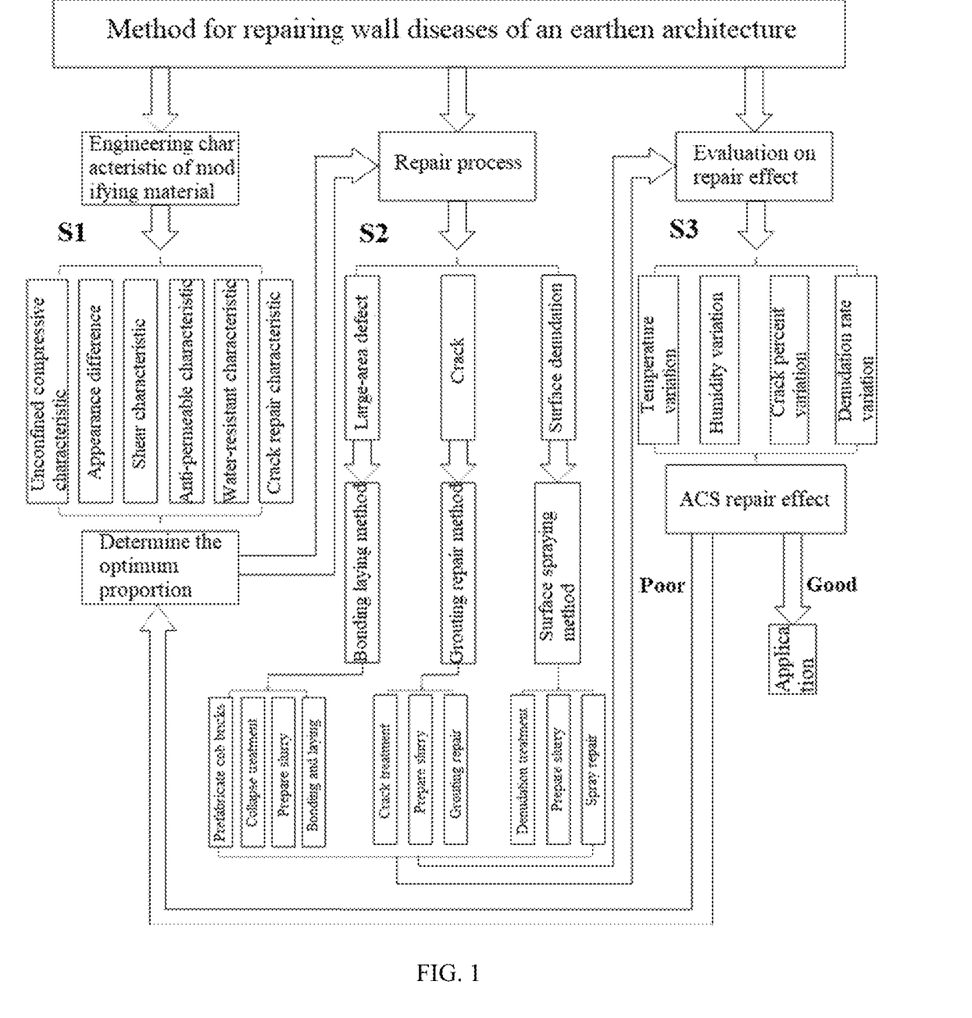
FIG. 1 is a flow chart of a method for repairing wall diseases of an earthen architecture provided by the present invention.
Figure 2:
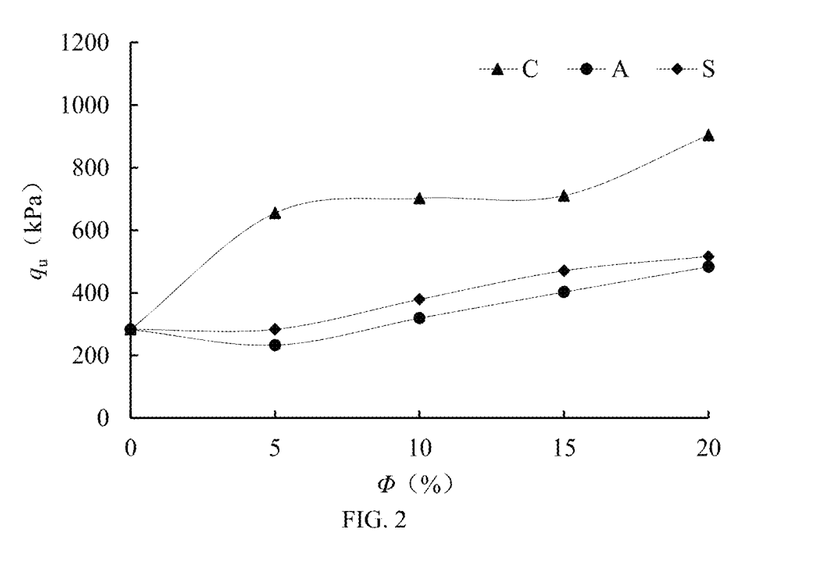
FIG. 2 is a curve graph of unconfined compressive strength of a repair material along with change of a material content during single doping in the method for repairing wall diseases of an earthen architecture provided by the present invention.
Figure 3:
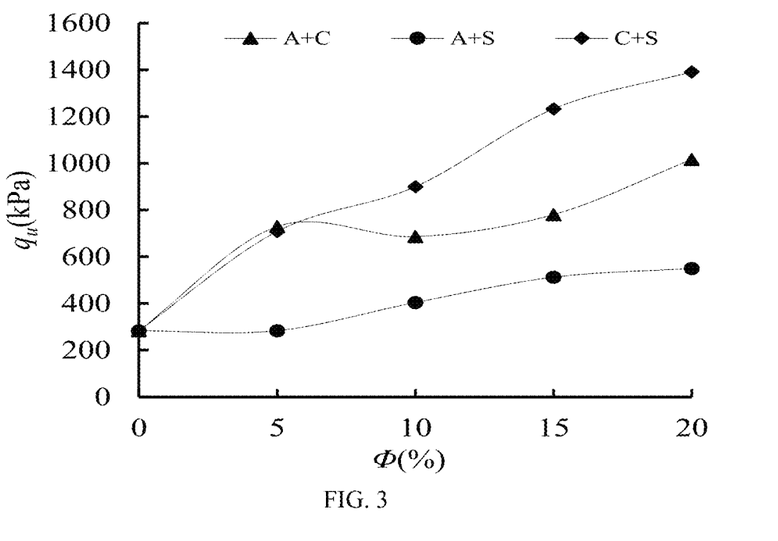
FIG. 3 is a curve graph of unconfined compressive strength of materials combined in pairs under the optimum proportion condition along with change of a material content during co-doping in the method for repairing wall diseases of an earthen architecture provided by the present invention.
Figure 4A:
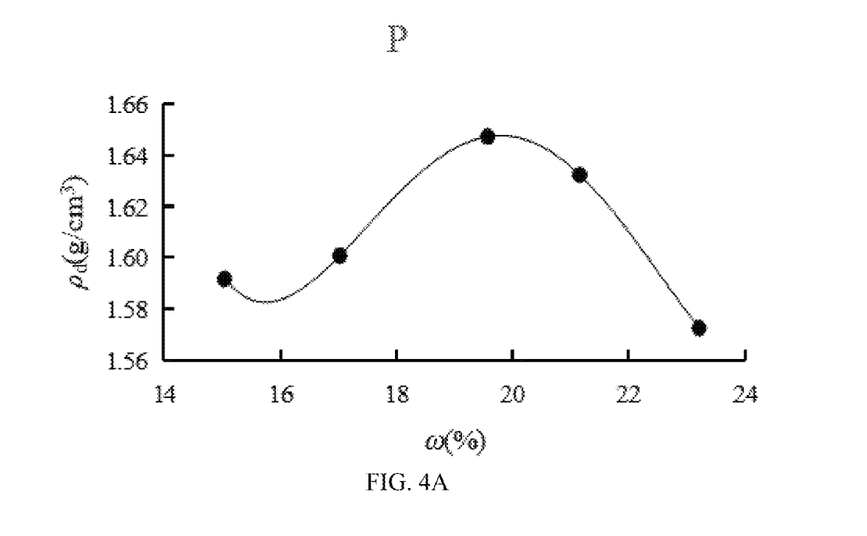
FIG. 4A is a compacted curve graph of plain soil in a method for repairing wall diseases of an earthen architecture provided by the present invention.
Figure 4B:
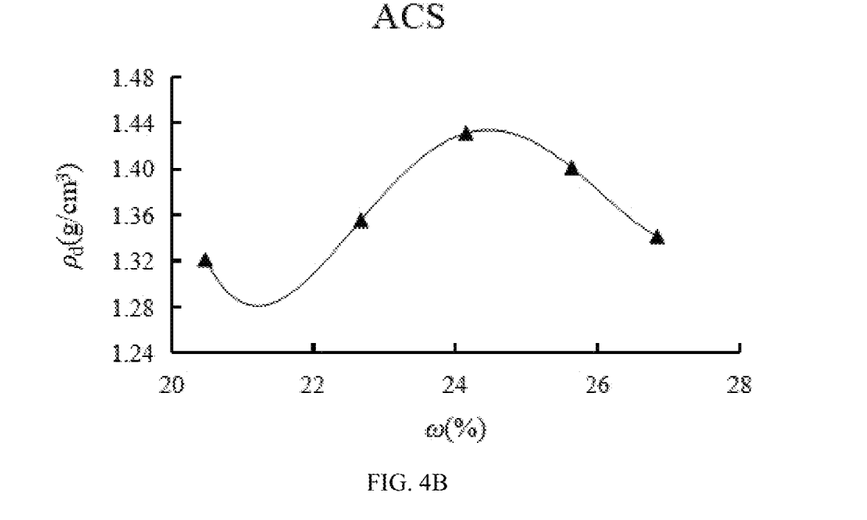
FIG. 4B is a compacted curve graph of the repair material in a method for repairing wall diseases of an earthen architecture provided by the present invention.

As shown in FIGS. 1-3, raw materials include the following components in parts by weight: 1-4 parts of metakaolin, 1-4 parts of calcium hydroxide and 1-4 parts of a micro silicon powder.

Proportions with the highest unconfined compressive strength are found respectively according to components and different contents in single doping, co-doping (double doping) and compound doping (triple doping).

A compound mixed ratio orthogonal test;

Let $M_1$ be the mass of the modifying material and $M_2$ be the mass of the plain soil, the proportion $\Phi$ of the modifying material can be expressed as:

$$\Phi = \frac{M_1}{M_2} \times 100\%; \qquad (1)$$

when $\Phi=20\%$, during mixed doping (triple doping) of metakaolin, $Ca(OH)_2$ and micro silicon powder, influence of the three added materials on unconfined compressive strength is studied through the orthogonal test.

The test includes three factors and four levels $L_{16}(4^3)$, shown in Table 1.

TABLE 1

| Factor and level table | | | |
|---|---|---|---|
| Level | A | C | S |
| 1 | 5% | 5% | 5% |
| 2 | 10% | 10% | 10% |

TABLE 1-continued

Factor and level table

| Level | A | C | S |
|---|---|---|---|
| 3 | 15% | 15% | 15% |
| 4 | 20% | 20% | 20% |

TABLE 2

Orthogonal test solution table

| No. | A | C | S |
|---|---|---|---|
| 1 | 5% | 5% | 5% |
| 2 | 5% | 10% | 10% |
| 3 | 5% | 15% | 15% |
| 4 | 5% | 20% | 20% |
| 5 | 10% | 5% | 10% |
| 6 | 10% | 10% | 5% |
| 7 | 10% | 15% | 20% |
| 8 | 10% | 20% | 15% |
| 9 | 15% | 5% | 15% |
| 10 | 15% | 10% | 20% |
| 11 | 15% | 15% | 5% |
| 12 | 15% | 20% | 10% |
| 13 | 20% | 5% | 20% |
| 14 | 20% | 10% | 15% |
| 15 | 20% | 15% | 10% |
| 16 | 20% | 20% | 5% |

To compare the repair materials with single and double factors conveniently, the ratios of the three admixtures in the earth are uniformly controlled at 20% herein. For example, in the test No. 1: 5% metakaolin+5% Ca(OH)$_2$+5% micro silicon powder, the ratio of metakaolin, Ca(OH)$_2$ and micro silicon powder can be controlled at 1:1:1, and the ratio of the three to the plain soil is always 20:100. It is shown as follows:

TABLE 3

Orthogonal test solution table (Amended)

| No. | A (part) | C (part) | S (part) |
|---|---|---|---|
| 1 | 1 | 1 | 1 |
| 2 | 1 | 2 | 2 |
| 3 | 1 | 3 | 3 |
| 4 | 1 | 4 | 4 |
| 5 | 2 | 1 | 2 |
| 6 | 2 | 2 | 1 |
| 7 | 2 | 3 | 4 |
| 8 | 2 | 4 | 3 |
| 9 | 3 | 1 | 3 |
| 10 | 3 | 2 | 4 |
| 11 | 3 | 3 | 1 |
| 12 | 3 | 4 | 2 |
| 13 | 4 | 1 | 4 |
| 14 | 4 | 2 | 3 |
| 15 | 4 | 3 | 2 |
| 16 | 4 | 4 | 1 |

Unconfined compressive strength tests are performed according to *GB50123-2019 Geotechnical Test Method Standard*, three groups of each test are performed, and the mean value is taken to reduce the error. The unconfined compressive strength of each group of modified soil sample is determined by using a conventional stress-strain controlled triaxial apparatus, shown in Table 4. The compressive strength in the plain soil test is 283.16 kPa.

TABLE 4

Orthogonal test result

| No. | Strength result (kPa) |
|---|---|
| 1 | 1374.17 |
| 2 | 1507.423 |
| 3 | 1528.244 |
| 4 | 1469.946 |
| 5 | 1374.17 |
| 6 | 1295.051 |
| 7 | 1407.483 |
| 8 | 1286.723 |
| 9 | 1240.917 |
| 10 | 1286.723 |
| 11 | 1203.44 |
| 12 | 1228.425 |
| 13 | 1282.559 |
| 14 | 1220.097 |
| 15 | 1061.859 |
| 16 | 1049.366 |

Range analysis and variance analysis are performed on the result in Table 4, with the results shown in Table 5 and Table 6.

TABLE 5

Range analysis in orthogonal test

| | 48 h unconfined compressive strength | | |
|---|---|---|---|
| No. | A | C | S |
| $K_1$ | 1469.946 | 1317.954 | 1230.507 |
| $K_2$ | 1340.857 | 1327.324 | 1292.969 |
| $K_3$ | 1239.876 | 1300.257 | 1318.995 |
| $K_4$ | 1153.47 | 1258.615 | 1361.678 |
| R | 316.4756 | 68.70851 | 131.1708 |

It can be known from Table 5 that the sequence of influence of various admixtures on the unconfined compressive strength of 48 h compound modified earth is as follows: metakaolin>micro silicon powder>Ca(OH)$_2$. The optimum proportion of the unconfined compressive strength is as follows: metakaolin:Ca(OH)$_2$:micro silicon powder=1:2:4.

TABLE 6

Variance analysis in orthogonal test

| Factor | Deviated quadratic sum | Degree of freedom | F ratio | F critical value | Significance |
|---|---|---|---|---|---|
| Metakaolin | 222525.830 | 3 | 3.823 | 3.29 | * |
| Calcium hydrogen | 11109.535 | 3 | 0.191 | 3.29 | — |
| Micro silicon powder | 36157.149 | 3 | 0.621 | 3.29 | — |
| Error | 291066.1 | 15 | — | — | — |

Note:
* represents significant difference ($p < 0.05$)

It can be known from Table 6 that the influence of metakaolin on the unconfined compressive strength of the modified earth is the most significant, which is consistent with the conclusion obtained in range analysis.

It can be known by integrating the unconfined compressive strength in single doping, co-doping and compound doping that under the compound doping condition, when the ratio of metakaolin, micro silicon powder and Ca(OH)$_2$ is 1:2:4, the strength of the repair material is the highest, and therefore, the proportion is the optimum proportion of the unconfined compressive strength and the material is taken as the modifying repair material (ACS).

Based on the modifying repair material, a soil sample with 45°, 0° and 90° through cracks (included angles between the crack surface and the horizontal plane) reserved is repaired. The modifying repair material with same water-solid ratio and the plain soil are respectively used for repair, the repaired earth is placed in a moisturizing jar (the temperature is 20° C., and the humidity is 80%) for curing for 7 d, 14 d and 28 d, and the unconfined compressive strength test is performed on the earth. The water-solid ratio of the repair material is controlled at 33% (the ratio of the mass of water to the sum of mass of the plain soil and the modifying material), and the thickness is 5 mm.

According to the moisture ratio $\omega_0=20\%$ and the maximum dry density $\rho_{dmax}=1.5$ g/cm$^3$, a cylindrical test sample with the diameter of 39.1 mm and the height of 80 mm is prepared in five layers, and is placed in a natural environment for 12 h for air-drying. The test sample is sleeved into a sleeve with dip angles of 45°, 0° and 90° and is cut into two parts along the oblique section of the sleeve, and the two oblique sections are shaved to enhance the repair effect.

It is known that the diameter of a transparent plastic tube is 40 mm and the height thereof is 90 mm, and 25 g of the modifying material with the optimum proportion and the moisture content of 33% is coated to the section of the cut test sample to be repaired. Then the test sample is placed in the plastic transparent tube for compaction and repair.

The repaired test sample is demolded and is put in the moisturizing jar with the temperature of 25° C. and the humidity of 80% for curing for 7 d, 14 d and 28 d. Then the unconfined compressive strength is measured, so the repair effect is verified.

Figure 5A:
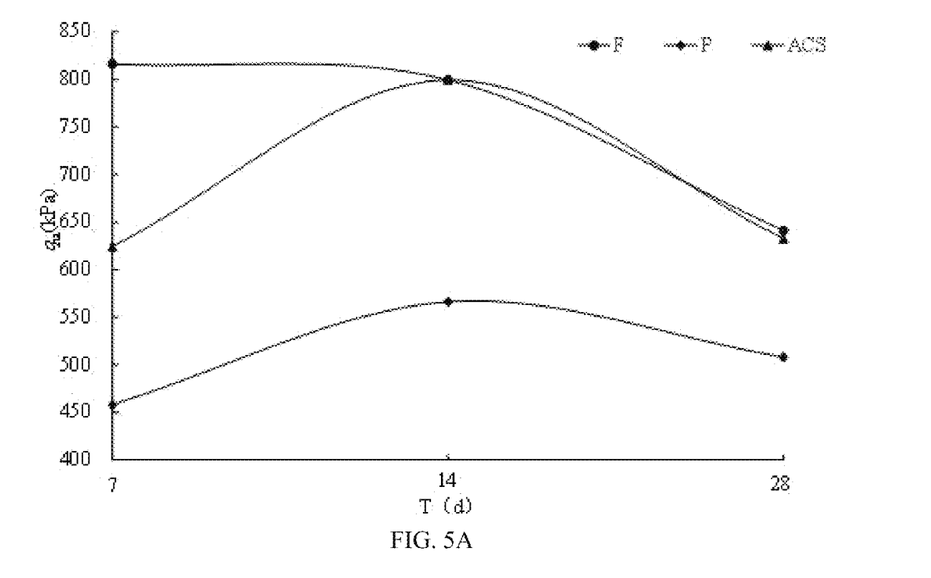
FIG. 5A is a curve graph of a recovery effect of repair strength of through cracks at in a method for repairing wall diseases of an earthen architecture provided by the present invention.
Figure 5B:
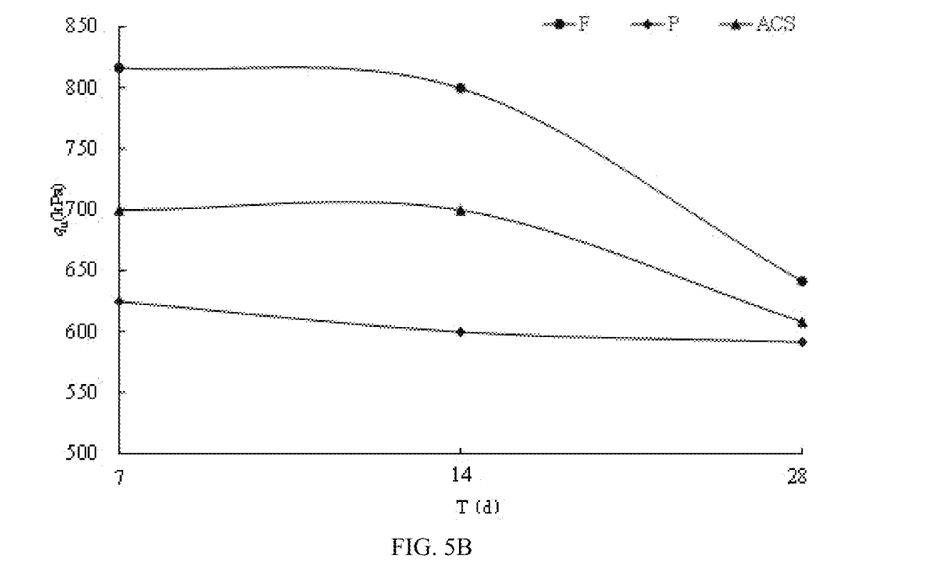
FIG. 5B is a curve graph of a recovery effect of repair strength of through cracks at in a method for repairing wall diseases of an earthen architecture provided by the present invention.

The effect of the repaired 45° through crack is shown in FIG. 5B.

With respect to mean strength, the composite material, i.e., metakaolin:Ca(OH)$_2$:micro silicon powder=1:2:4, is the material with the highest strength recovery rate, up to 100%, so the repair effect of the ACS material is the best.

Figure 5C:
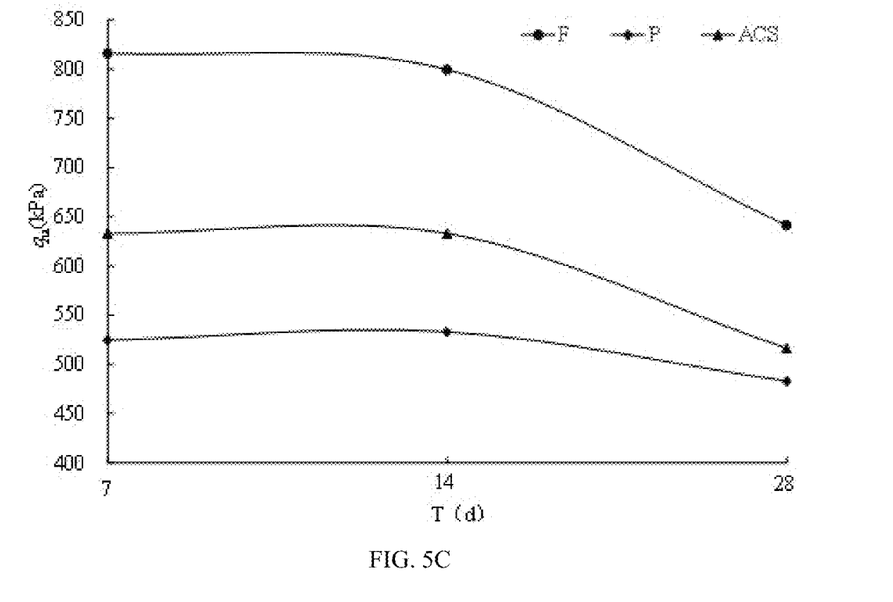
FIG. 5C is a curve graph of a recovery effect of repair strength of through cracks at in a method for repairing wall diseases of an earthen architecture provided by the present invention.
Figure 6:
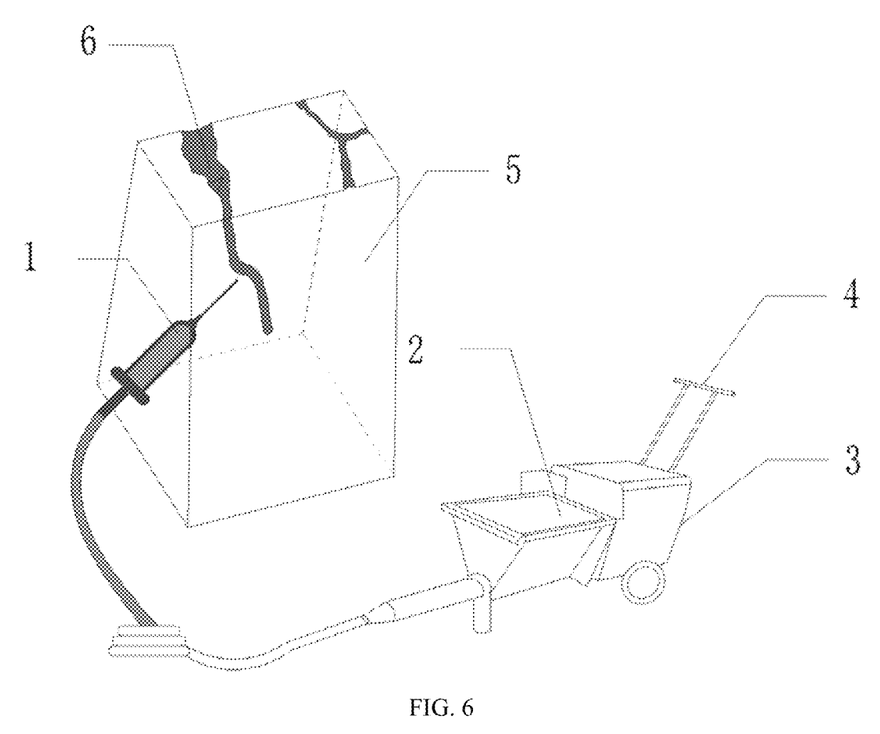
FIG. 6 is a structural schematic diagram of a pressure grouting machine in a method for repairing wall diseases of an earthen architecture provided by the present invention.
Figure 7A:
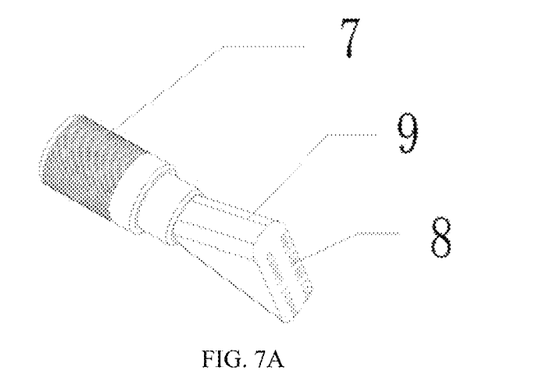
FIGS. 7A-7D are structural schematic diagrams of several replaceable nozzles in a method for repairing wall diseases of an earthen architecture provided by the present invention.
Figure 7B:
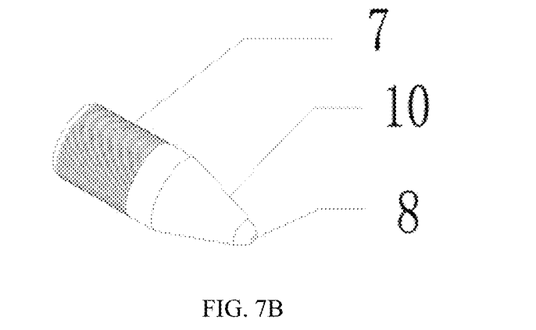
Figure 7C:
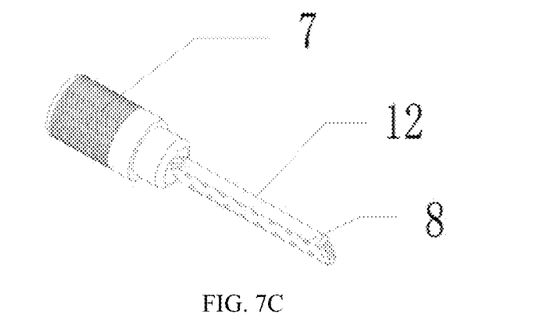
Figure 7D:
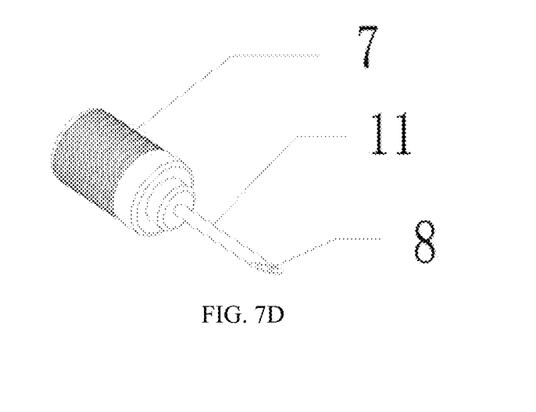
Figure 8:
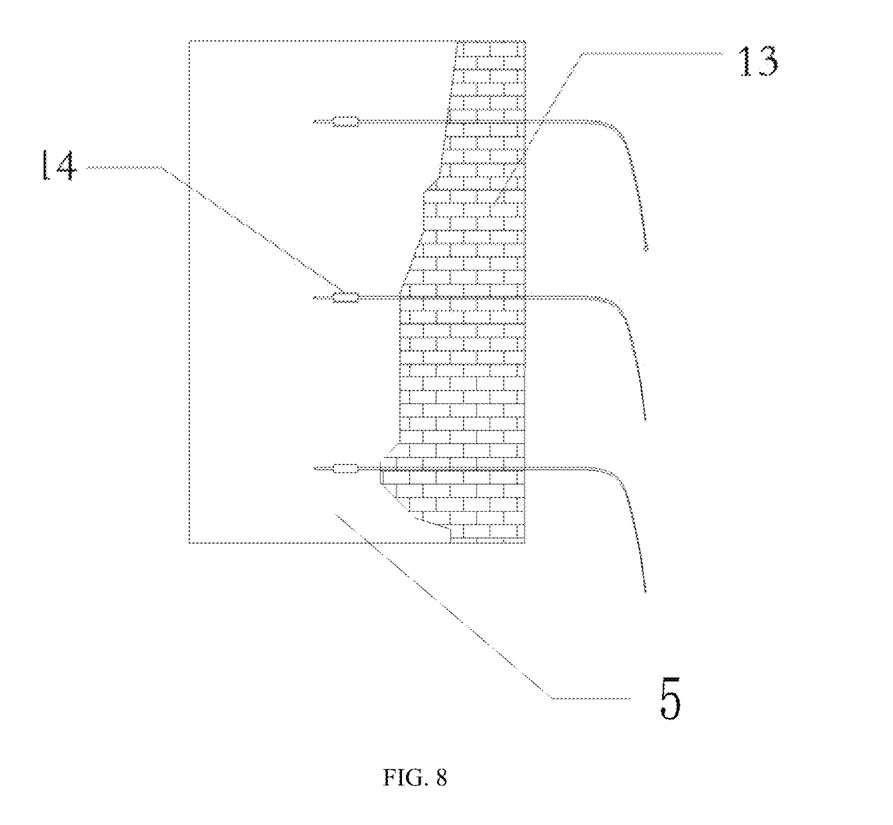
FIG. 8 is a layout diagram of TDR probes at monitoring points in repair effect evaluation in a method for repairing wall diseases of an earthen architecture provided by the present invention.

Similarly, the repair results of the soil samples at 0° and 90° are also shown in FIGS. and 5C, respectively.

It can be known from the above figures that with respect to the 45° through crack, the composite material (ACS) has the highest mean repair rate on the 7$^{th}$ d, 14$^{th}$ d and 28$^{th}$ d, and the strength recovery rate can reach 92% of that of an intact soil sample (F), which is 1.3 times of that repaired by the plain soil; with respect to a test sample with 0° horizontal through rack, the mean recovery rate of the composite material can reach 89%, which is 1.1 times of that of the plain soil (P); and with respect to a test sample with 90° through crack, the mean repair rate of the composite material can reach 79%, which is 1.2 times of that of the plain soil.

The optimum proportion of the modifying repair material is determined, based on the results of the crack resistance tests performed on soil samples reinforced with various ratios of metakaolin, Ca(OH)$_2$, and micro-silicon powder. Comparative analysis of crack width, distribution, and repair effectiveness indicates that the combination of metakaolin:Ca(OH)$_2$:micro-silicon powder in a mass ratio of 1:2:4 achieves the best reinforcement effect. This composition exhibits minimal cracking, enhanced cohesion, and improved structural stability in the repaired soil matrix, thereby confirming its suitability as the optimum formulation for the ACS repair material.

Engineering performance of the material is shown in Table 7.

TABLE 7

Comparison result on comprehensive engineering characteristics of the modifying material

| Type | Permeability characteristic $K_T$ | Water resistance (T) | Shear characteristic $T_f$ (kPa) |
| --- | --- | --- | --- |
| P | 3.2 × 10$^{-5}$ | <20 min | 204.6 |
| ACS | 3.8 × 10$^{-5}$ | >60 min | 600.1 |

The water resistance and the shear strength of the repair material ACS are superior to those of the plain soil P, and the permeability of the ACS is slightly greater than that of the plain soil P, which facilitates migration of moisture in the site.

Finally, it can be obtained from a crack repair test that the integrity of the soil sample repaired by ACS is higher than that repaired by the plain soil P, which is approximately 1.2 times of that repaired by the plain soil P, and the maximum repair rate is 100%. The optimum proportion of the material ACS is as follows: metakaolin:Ca(OH)$_2$:micro silicon powder=1:2:4.

For common diseases of the earthen site, a method for repairing wall diseases of an earthen architecture provided by the present invention is described below.

Aiming at three common diseases (large-area collapses, cracks and surface denudation) of the earthen site, by adjusting the water-solid ratio of the repair material ACS, corresponding repair methods are proposed by adopting different processes. Main instruments used in the method include pressure grouting machine/spraying machine with replaceable nozzles such as triangular nozzles, strip pattern nozzles, needle tube nozzles and round nozzles, shown in FIG. 6 and FIGS. 7A-7D. The triangular nozzle is mainly applied to large-area smearing, the round nozzle is mainly applied to surface spraying, the strip pattern nozzle is mainly applied to large crack repair, and the needled tube nozzle is mainly applied to fine crack repair.

When the diseases of the earthen site are large area defects (large-area collapses), for the diseases of the large-area collapses, a bonding and laying repair method is used. First, plain soil bricks are prefabricated, and then the collapses are bonded, laid and repaired through repair material paste ACS. The water-solid ratio of the repair material ACS is 33%, and the thickness of the bonding repair material ACS paved is properly ⅓-¼ of that of the plain soil bricks.

A specific repair flow process is as follows:

plain soil brick prefabrication:

The material of the cob bricks is properly the plain soil near the site, ensuring that the physical and chemical components thereof are kept consistent with those of the earthen site. In the making process, the soil is compressed with the maximum dry density and the optimum moisture content, fully ensuring that the soil is compressed to the most compact state. The size of the cob bricks is determined according to the area of the defected part, and the length, width and height are in a two-time relation (such as 4a×2a×a).

Before laying the prefabricated cob bricks, the surface of the part to be repaired is cleaned.

Interfacial regosol is cleaned thoroughly with a blower or a hairbrush, and corner parts are cleaned critically. After cleaning, water is sprayed for infiltration, ensuring that the repaired part is better bonded with the site body.

Defected Part Piling:

The cob bricks are bonded and laid on the defected part of the site with the ACS repair paste. Specific operations are as follows: the plain soil bricks are put in order in layers, where gaps filled with the repair mortar are reserved among the bricks, and the material ACS is injected onto the upper and lower surface of the plain soil bricks and the gaps of the bricks in the layer through the grouting machine by using the triangular nozzle. Repair is performed in sequence in layers. In the piling process, the bricks grip with rafts and the joints in the upper and lower layers are staggered, a "three-one" brick method (i.e., a shovel of mortar, a brick and extrusion) is adopted, and a method of slushing and pouring cracks with water is prohibited. Corners are repaired with intact bricks to the greatest extent.

When the diseases of the earthen site are cracks, with respect to crack diseases, a grouting repair method is adopted. ACS repair slurry is prepared first, and pressurized or unpressurized grouting is selected according to a site situation.

ACS Repair Slurry Preparation:

The repair material ACS with the optimum proportion is taken, where the water-solid ratio is 40% (the flowability of the slurry is improved, the volume shrinkage is reduced, and a 5% water reducer can be added). It is prepared as needed. In the using process, continuous stirring is performed to prevent bleeding and segregation.

Crack Treatment:

Miscellaneous soil on the surface of the original crack is cleaned, the crack is scraped into a V-shaped groove, and the regosol in the crack is blown out with pressurized wind. The cleaned V-shaped groove is watered for infiltration, and a water outlet shall be adjusted to the vaporific state during watering, where the size wall of the crack is moistened without flowing water properly.

Grouting Repair:

The repair material ACS is injected into the crack scraped into the V-shaped groove for repair through the grouting machine by using the strip pattern or needle tube nozzle according to shape and size of the crack. Large crack can be subject to pressurized grouting with the strip pattern nozzle, the pressure is controlled without damping the site, and small crack is subject to unpressurized grouting with the needle tube nozzle. After grouting is finished, the surface of the grouting body is trowelled.

When the diseases of the earthen site are surface denudation, for the disease of surface denudation, a surface spraying method is adopted. The denuded regosol is cleaned first, then the earthen site is watered for infiltration, and the repair material ACS is sprayed to the surface of the denuded part for repair through the spraying machine.

Slurry Preparation:

The repair material ACS with the optimum proportion is taken, where the water-solid ratio is 40% (the flowability of the slurry is improved, the volume shrinkage is reduced, and a 5% water reducer can be added). It is prepared as needed. In the using process, continuous stirring is performed to prevent bleeding and segregation.

Denudated Surface Treatment:

The regosol on the denuded surface is cleaned by the pressurized wind and the denuded surface is watered for infiltration.

Surface Spraying:

The repair material slurry ACS with the water-solid ratio of 40% is sprayed to the surface of the denuded part through the grouting machine by using the round nozzle. Pressure control of the grouting machine is decided by the stability of the site itself and is not too large, thereby preventing structural damages to the site itself. In the spraying process, the shape area of spraying can be controlled by changing the type of the nozzle (round, duckbill and fan-shaped nozzles), and the distance from a spray rod to the site itself is determined according to an injection pressure, and is properly 0.5-1 m.

The effect of repair by a method for repairing wall diseases of an earthen architecture provided by the present invention is evaluated below.

After repair is finished, the temperature and the water moisture of the site are detected through the TDR probe buried previously. It is shown in FIG. 8 and FIGS. 9A-9D.

Figure 9A:
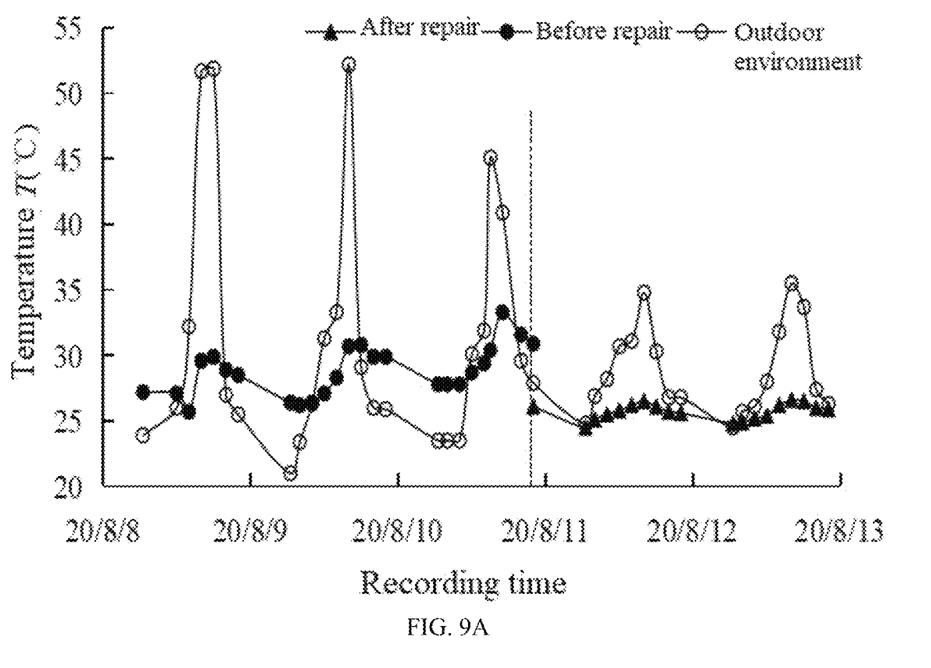
FIG. 9A is a curve graph of a variation relation of temperature of a soil mass before and after repair in a method for repairing wall diseases of an earthen architecture provided by the present invention.
Figure 9B:
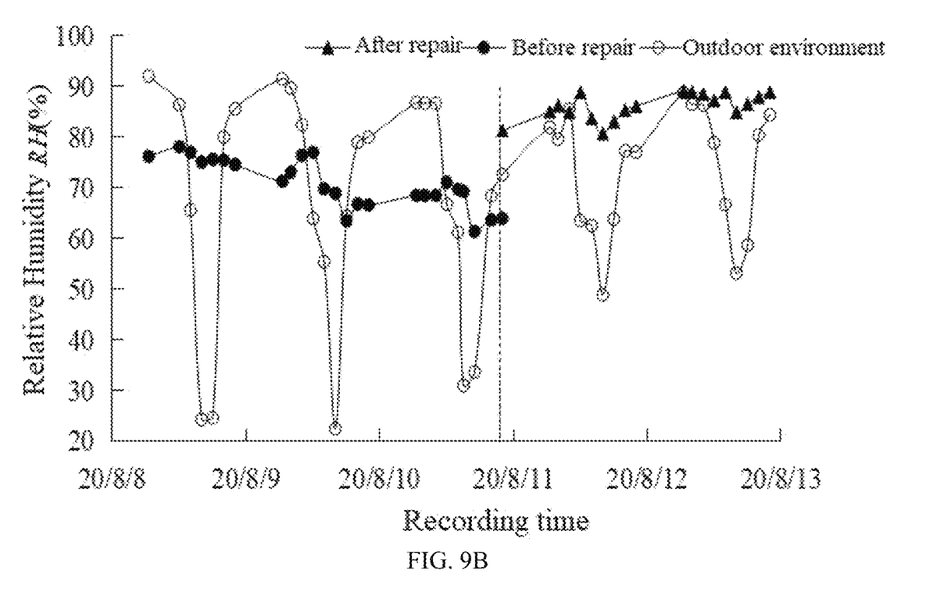
FIG. 9B is a curve graph of a variation relation of relative humidity of the soil mass before and after repair in a method for repairing wall diseases of an earthen architecture provided by the present invention.

It can be known from FIGS. 9A-9B that the changing amplitudes of outdoor temperature and humidity are the maximum, the temperature ranges from 20° C. to 55° C., and the humidity ranges from 20% to 95%; the temperature and humidity of the diseases earthen wall are less affected by the external environment, the temperature ranges from 25° C. to and the humidity ranges from 60% to 80%; after the diseases are repaired, the temperature and humidity of the diseases earthen wall are less affected by the external environment, the temperature ranges from 23° C. to 28° C., and the humidity ranges from 80% to 90%.

The temperature and humidity of the repaired earthen wall are less affected by the external environment compared with those of the earthen wall which is not repaired, which facilitates long-term preservation of the site and indoor environment as well.

It is known that the denudation quantity every time is n, the total mass of the earthen wall is N, and the length of the crack is $l_i$ and the width thereof is $W_i$, the denudation rate η and the crack percent ψ can be defined as:

$$\eta = \frac{n}{N} \times 100\%; \tag{2}$$

$$\psi = \sum_1^i \frac{L_i \times W_i}{A}. \tag{3}$$

Figure 9C:
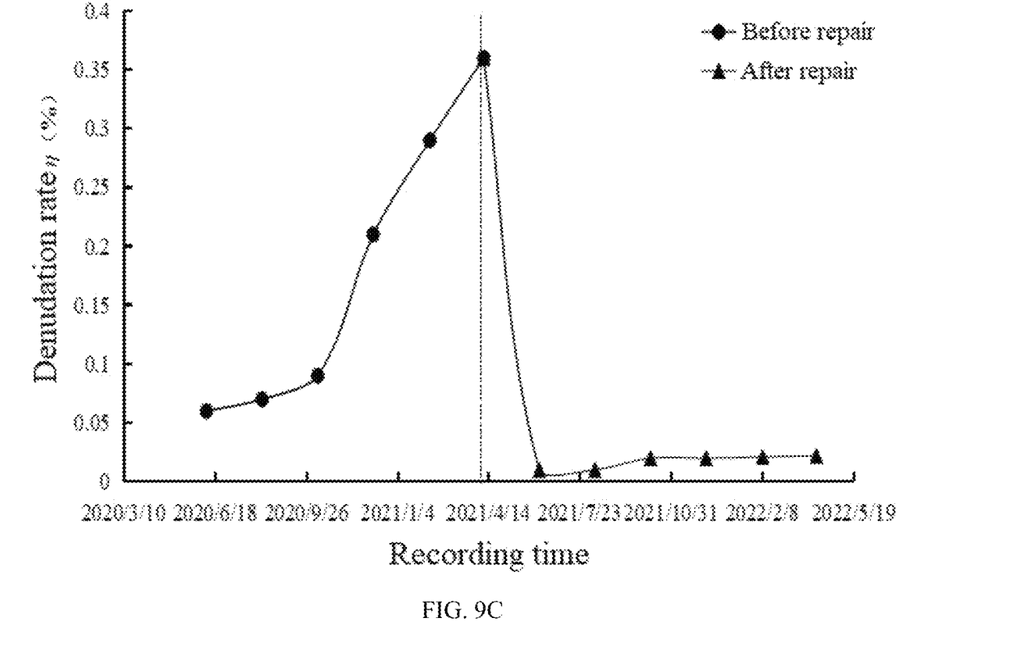
FIG. 9C is a curve graph of a variation relation of denudation rate of the soil mass before and after repair in a method for repairing wall diseases of an earthen architecture provided by the present invention.
Figure 9D:
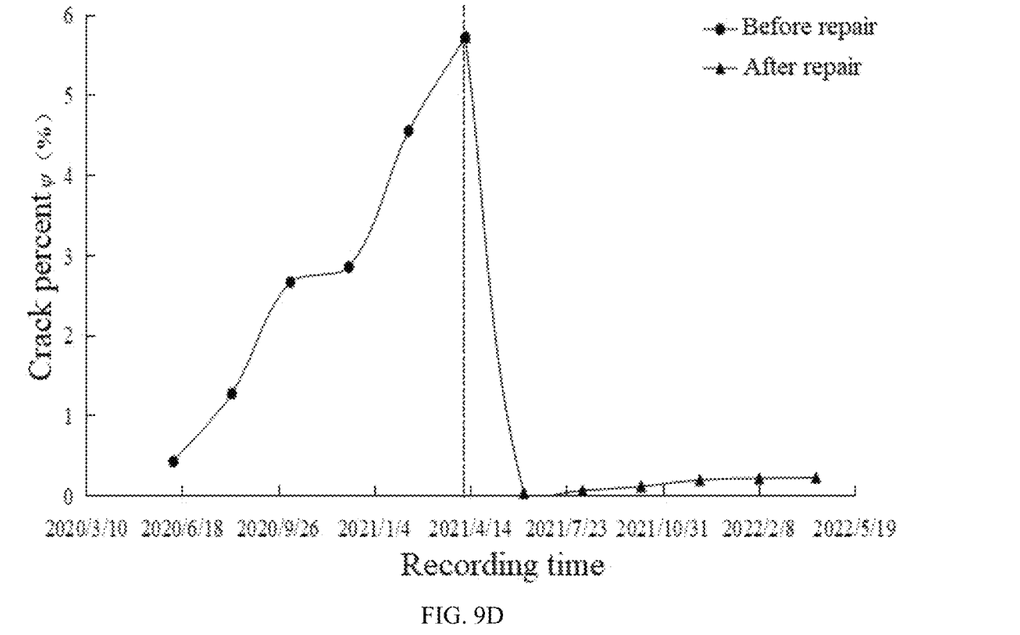
FIG. 9D is a curve graph of a variation relation of crack percent of the soil mass before and after repair in a method for repairing wall diseases of an earthen architecture provided by the present invention.

It can be known from FIGS. 9C-9D that after repair, the denudation rate and the crack percent of the earthen wall are significantly reduced, where the denudation rate decreases from the highest 0.36 originally to 0.02%, which decreases by 90%, and the denudation rate almost no longer increases subsequently; the crack percent decreases from the highest 5.73% to 0.23%, which decreases by 95%, and the crack expansion rate decreases obviously subsequently.

It can be known that variations of the temperature and humidity in the repaired earthen wall affected by the external environment decrease obviously, and the denudation rate and the crack percent are significantly reduced compared with those of the earthen wall which is not repaired. The repair effect of the ACS material is better, which facilitates protecting and repairing work of the earthen wall and the earthen site.

According to the method for repairing wall diseases of an earthen architecture provided by the present invention, the repair material (ACS) is found through unconfined compressive strength tests in single doping, co-doping and compound doping. In the state of the maximum dry density and the optimum moisture content, the physical and mechanical properties of the earthen architecture are studied. The components of the repair material ACS are determined by comparing the basic properties of the material and the repair effect of the pre-crack. By adjusting the water-solid ratio of the repair material ACS, common diseases are repaired by adopting different repair processes. The repair material ACS prepared in the present invention features excellent performance, stable volume and good compatibility with a site. The method based on the repair material ACS provided by the present invention has certain practical significance in repairing diseases of the earthen site.

What is claimed is:

1. A method for repairing wall defects of an earthen architecture, comprising:

selecting raw material components: 1-4 parts of metakaolin, 1-4 parts of calcium hydroxide and 1-4 parts of a micro silicon powder, and mixing the raw material components to prepare a mixed material;

mixing the mixed material with natural soil at a mixing ratio of 1:5 to prepare a repair material;

mixing the repair material with water at a dilution ratio of 1:4 to 2:3 to prepare a slurry, adjusting the dilution ratio of the repair material to the water to prepare the slurry based on defects of an earthen architecture, putting the slurry into a pressure grouting machine, and repairing the defects of the earthen architecture by using the pressure grouting machine; and conducting a contrast experiment by measuring parameters of the earthen architecture before and after repair using an instrument, determining the extent of an external environment on the earthen architecture and assessing effectiveness of the repair based on the measured parameters.

2. The method according to claim 1, wherein the selecting raw materials components further comprises a proportion of components of the repair material is as follows: 1-3 parts of metakaolin, 2-4 parts of calcium hydroxide and 2-4 parts of the micro silicon powder.

3. The method according to claim 2, wherein the selecting raw materials components further comprises a proportion of components of the mixed material is as follows: 1 part of metakaolin, 2 parts of calcium hydroxide and 4 parts of the micro silicon powder.

4. The method according to claim 1, wherein the pressure grouting machine comprises a hopper and a case, wherein the hopper and the case are connected in sequence; the hopper is connected to a hose, and a replaceable nozzle head is in threaded connection to a second end of the hose, wherein the second end of the hose is positioned at a distance from the hopper; and the replaceable nozzle head comprises at least one of a triangular nozzle, a round nozzle, a needle tube nozzle and a strip pattern nozzle.

5. The method according to claim 4, wherein the mixing the repair material with water further comprises:

the defects of the earthen architecture comprise large-area collapses, cracks and surface denudation, wherein for the large-area collapses: prefabricating plain bricks: cleaning a surface of a part to be repaired to obtain the plain bricks, supplying the slurry into the pressure grouting machine, and bonding and laying cob bricks to collapsed parts of the earthen architecture by using the pressure grouting machine with the triangular nozzle, wherein the cob bricks are made from soil at a site of the earthen architecture;

for the cracks: stirring the slurry, removing miscellaneous soil on surfaces of the cracks, scraping the cracks to V-shaped grooves, and watering the cracks for moisturizing; and using the needle tube nozzle or the strip pattern nozzle according to shapes and sizes of the cracks, and injecting the slurry into the cracks of the V-shaped grooves through the pressure grouting machine for repair; and for the surface denudation: stirring the slurry, cleaning regosol of denudated surfaces with pressurized wind, and watering the denudated surfaces for moisturizing; and spraying the slurry to the denudated surfaces through the pressure grouting machine by using the round nozzle.

* * * * *